April 12, 1949.　　　　　R. W. MAY　　　　　2,466,776
AUTOMATIC SHAFT CONTROLLING APPARATUS Filed Dec. 14, 1946　　　　　　　　　　　　　4 Sheets-Sheet 1

INVENTOR.
RICHARD W. MAY
BY John J. Rogan
ATTORNEY

INVENTOR.
RICHARD W. MAY
BY John J. Rogan
ATTORNEY

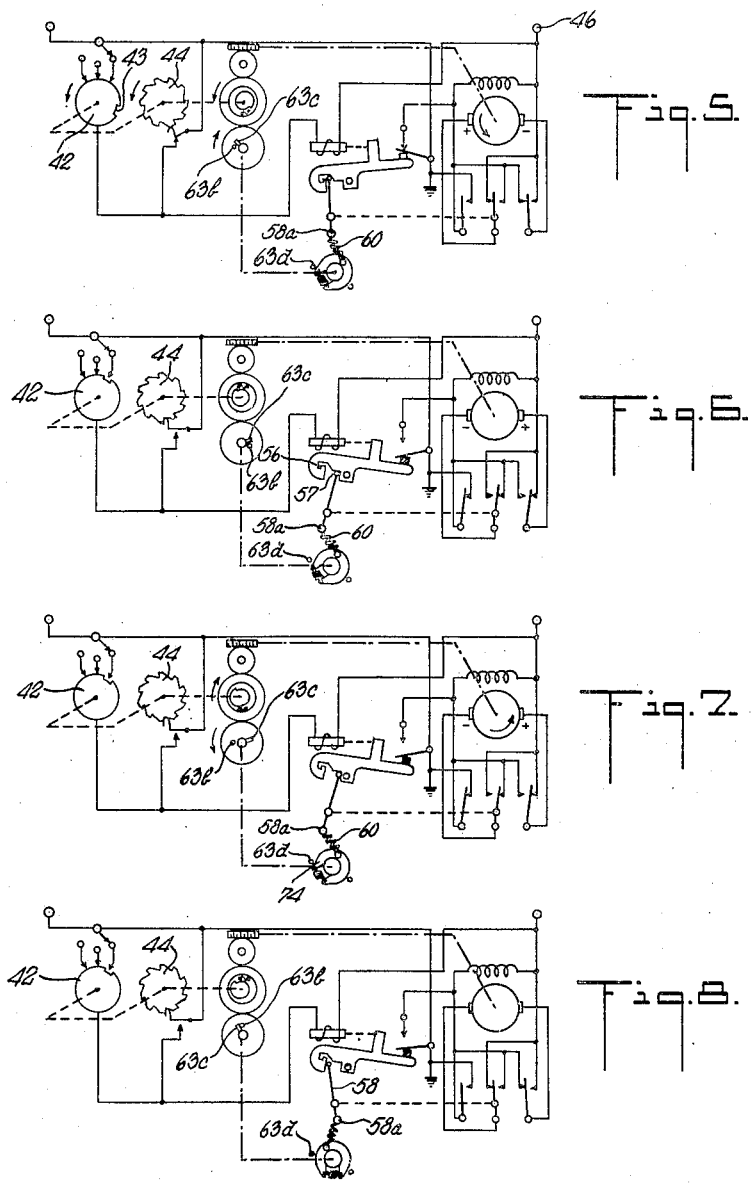

April 12, 1949.  R. W. MAY  2,466,776
AUTOMATIC SHAFT CONTROLLING APPARATUS
Filed Dec. 14, 1946  4 Sheets-Sheet 4

INVENTOR.
RICHARD W. MAY
BY John J. Rogan
ATTORNEY

Patented Apr. 12, 1949

2,466,776

UNITED STATES PATENT OFFICE 2,466,776

AUTOMATIC SHAFT CONTROLLING APPARATUS

Richard W. May, Cedar Rapids, Iowa, assignor to Collins Radio Company, Cedar Rapids, Iowa, a corporation of Iowa Application December 14, 1946, Serial No. 716,206

15 Claims. (Cl. 192—142)

This invention relates to automatic shaft positioners and more especially to an improved system and organization of apparatus for automatically tuning or positioning radio equipment and the like.

A principal object of the invention is to provide a more accurate automatic shaft positioning arrangement of the type employing a selectively rotatable stopping cam barrel which is selectively controlled by a corresponding rotatable selector switch of the finder type.

Another object is to provide a highly accurate centering control or timing arrangement for automatic shaft positioners of the rotatable cam barrel and selector switch type.

A feature of the invention relates to an automatic shaft-positioning system having a series of position-stopping pawls which are selectively moved under control of a rotatable cam barrel and associated automatic selector switch, and embodying a special timing and selector switch centering control device for more accurately synchronizing the cam barrel and the switch.

Another feature relates to highly accurate automatic tuning control arrangement comprising a selectively rotatable cam barrel and an automatic switch of the finder type which is rotatable in unison with the cam barrel, in conjunction with a set of timing or centering contacts to insure that the switch control circuit remains closed until the cam barrel is accurately stopped in a selected angular position.

A further feature relates to an improved organization of electric circuits and controls for an automatic tuning control system of the generic type disclosed in Reissue Patent No. 22,574, whereby the accuracy of selective stopping of the shaft to be controlled is greatly enhanced.

A still further feature relates to the novel organization, arrangement and relative interconnection of parts which cooperate to provide an improved and compact automatic tuning control device for radio equipment and the like.

In the drawing,

Figs 2 to 8 are simplified schematic diagrams showing successive stages in the operation of the system of Fig. 1.

The invention finds its immediate utility in automatic tuning control devices of the type disclosed in Reissue Patent No. 22,574. In general, that type of device employs a series of selectively shiftable stopping pawls one for each position at which the tuning member is to be stopped. These pawls are moved to selective position under control of a cam barrel having a series of recesses around and along its periphery, there being one recess for each pawl. By rotating this barrel to any selected angular extent, only one of the pawls is selected or prepared for final stopping of the tuning member. In such an arrangement, there is a fixed angular relation between the cam barrel recesses and the successive pawls. However, in the actual automatic tuning of radio apparatus and the like, it is necessary to be able to vary within wide limits, the angular spacing between any two successive selected positions of the device to be tuned. It becomes necessary therefore, to employ what is known as a stop ring drum which usually comprises a series of stopping rings each having a stopping lug which cooperates with a corresponding pawl. These rings are capable of being rigidly clamped to form a unitary rotatable assembly or drum, while allowing the individual rings to be preset, before clamping, to correspond with the desired angular stopping positions of the device to be tuned. In order to control the mechanism automatically, it is necessary to employ an electric selector switch of the so-called "finder" type. This switch has a rotatable disc or brush and a set of fixed associated bank contacts, there being one contact for each of the stopping pawls above described. These bank contacts are equi-angularly distributed around the switch axis, and therefore correspond angularly with the peripheral angular spacing of the recesses in the aforementioned cam barrel. In order to set the device which is to be tuned, with the proper accuracy, it is necessary that the rotatable disc or brush of the finder switch be accurately synchronized or timed with relation to the cam drum. Since the switch contacts may have considerable inertia, and may have considerable overlap between the brush surface and the intercontact spaces, it may happen that the timing of the rotation and stopping of the cam drum and of the rotary switch will not be properly correlated. Since the same driving motor is used both for the switch and for both drums, and since the motor starting and stopping circuits are controlled primarily by the rotary switch, I have found it necessary, in some cases, to provide an additional circuit controller to insure that the selector switch is stopped and centered accurately on the desired bank contact, before opening the motor circuit, so as to insure that the selected recess in the cam drum is properly centered with respect to the desired stopping pawl.

Figure 1:
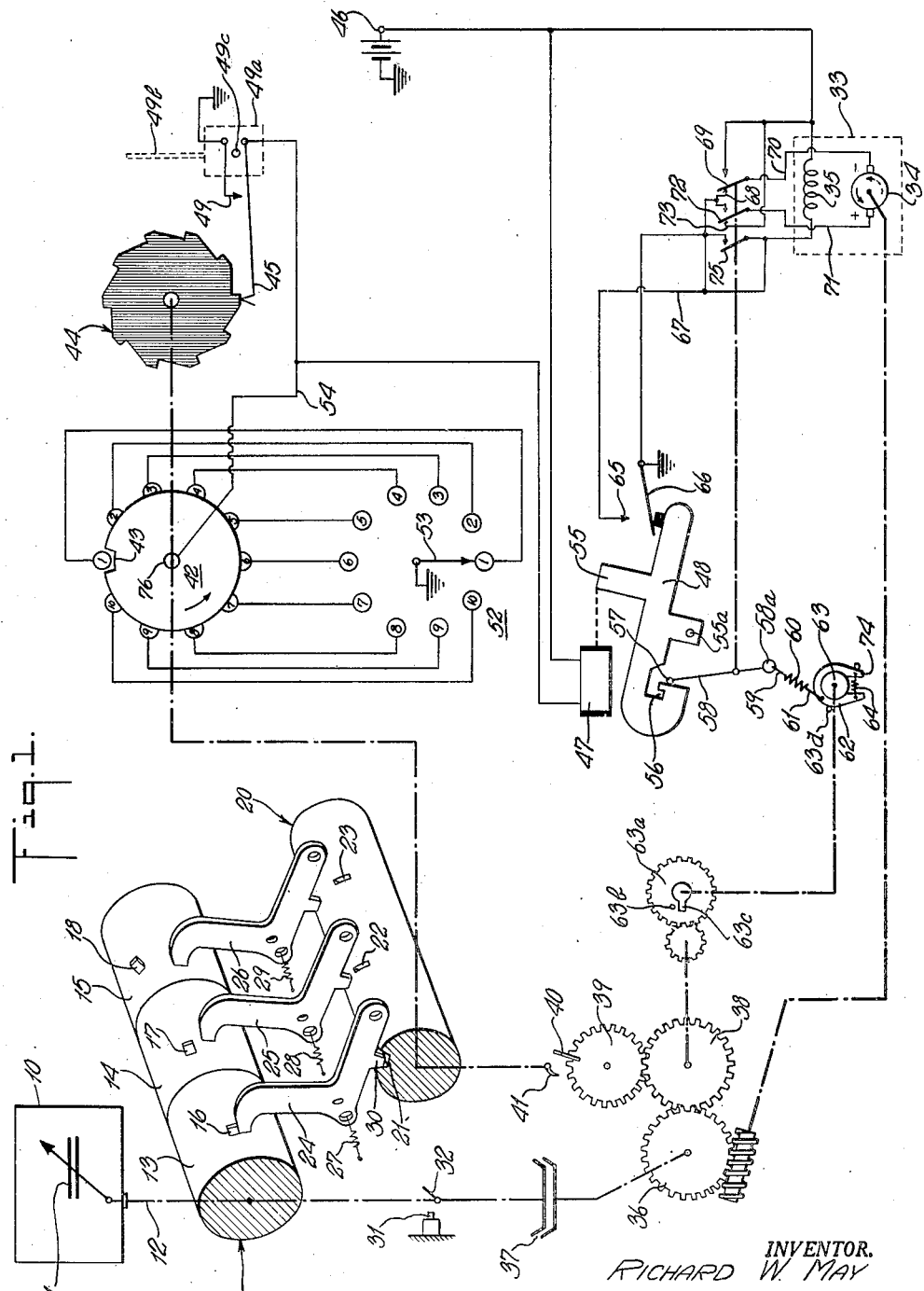
Fig. 1 is a composite electrical circuit and apparatus schematic diagram of a system embodying features of the invention.

In Fig. 1, there is shown in schematic circuit and mechanical diagram form a shaft controlling system which overcomes the disadvantages of the prior systems of the above-noted generic type. In Fig. 1, the block 10 represents any portion of a radio set or the like having an adjustable element 11, for example a rotary condenser, which is required to be selectively set at any one of a series of angular positions. The rotatable elements of condenser 11 are suitably fastened to a shaft 12, which, for convenience, will be called the master shaft. Shaft 12 has fastened thereto a series of stop rings 13, 14, 15, each having an individual stopping lug 16, 17, 18. These rings are releasably clamped together to form a stop ring drum 19, so that once the individual rings are preset around the axis of the drum in accordance with the desired selective positions of shaft 12, they can be clamped together to rotate thereafter as a unit.

Mounted with its rotational axis parallel to the longitudinal rotational axis of drum 19, is a cam barrel 20, having a series of recesses 21, 22, 23, respectively in planar alignment with the corresponding lugs 16, 17, 18. Recesses 21, 22, 23, are spaced equal distances around the barrel 20 in a helical path. Pivotally mounted for co-operation with each stopping lug and recess, is a corresponding pawl 24, 25, 26, each pawl having its upper end normally urged towards the drum 19 by an associated spring 27, 28, 29. However, each pawl has a tooth 30 which rides on the periphery of cam drum 20. The pawls are all alike and the dimensions and shape are such that the upper end of the pawl cannot move into the path of the associated stop lug 16, 17, 18, until the tooth 30 drops into its associated recesses 21, 22, 23. When this takes place, the upper end of the selected pawl is in the direct path of the associated stop lug, so that when drum 19 rotates in a clockwise or selecting direction, it finally meets the selected pawl and is positively stopped against further rotation. However, in order to start from some definite known normal position, it is first necessary to rotate drum 19 counter-clockwise to a homing position. In other words, during the counter-clockwise rotation of drum 19, it is being returned to a home or reference position from a previously selected position; and during its clockwise rotation it is being moved to a new selective position. For this purpose, there is provided a fixed homing stop 31, and a homing stop lug 32, which is rotatable as a unit with drum 19.

The motive power for the homing and final selecting movements of drum 19, and for the cam drum 20, is provided by a single reversible electric motor 33, having an armature 34 and a field winding 35. Motor 33 drives the elements 32, 19 and 12, through suitable gearing 36, and through an intervening slip-friction clutch 37. However, the cam drum 20 is driven in a single direction by gear 38, which rotates a disc 39 carrying a pin 40, which is adapted to engage a ratchet member 41, fastened to the shaft of drum 20. Because of the ratchet arrangement, the drum 20 is driven only in a counter-clockwise direction. While Fig. 1 of the drawing shows the drum 13 with three stop rings and the drum 20 with three recesses and three stopping pawls, it will be understood that a greater number may be employed depending upon the number of positions to which the device 11 is to be tuned.

Also driven from the ratchet 41 and attached to the same shaft as the shaft of drum 20, is the contactor disc 42 of an electric selector switch of the finder type. The disc 42 has a cutout portion 43 in its circumference. Mounted adjacent disc 42 so as to be electrically contacted thereby during the rotation of the disc, is a series of fixed bank contacts #1 to #10, there being one such contact for each recess in the drum 20. Also attached to the common shaft of drum 20 and disc 42, is a timing cam wheel 44, whose teeth are arranged to open and close the movable contact 45 which completes a circuit from the positive terminal 46 of a battery or other D. C. supply source through the winding 47 of motor control switch 48 to ground through the contact 49. It is clear therefore, that the circuit for the winding 47 is broken at the instant that the crest of each tooth on wheel 44 engages spring contact 45. The wheel 44 is preferably adjustably fastened to the shaft 50, carrying the disc 42 so that the wheel can be initially and accurately adjusted so as to insure that the contacts 45 and 49 open only when the cutout section 43 of disc 42 is in accurate centered position with respect to the selected bank contact. However, in order to provide an adjustable centering after the parts have been assembled, the contacts 45 and 49 may be carried on a common block 49a but insulated from each other, the block being provided with an indicator arm 49b which can be adjusted so as to rotate the contact assembly around a pivot 49c, thus changing the relative timing between the opening of contacts 45, 49, and the rotation of wheel 44.

It will be noted that the bank contacts of the finder switch are multipled to corresponding fixed contacts of a manually operable switch 52 whose contact arm 53 is grounded. In the particular position shown in Fig. 1, the mechanism had been previously set to select #1 pawl as is shown by the fact that brush 53 is in engagement with contact #1, consequently the disc 42 had been previously stopped during the automatic cycle by reason of the fact that the cutout 43 is centered but out of engagement with the contact #1.

In order to start the cycle of operations for a new selection, for example to select pawl #3, brush 53 is manually moved to contact #3 which closes a circuit from ground through brush 53, contact #3 of switch 52, contact #3 of the finder switch, disc 42, conductor 54, and thence through the switch control winding 47, to the battery terminal 46. Winding 47 being thus energized, attracts the lug 55 of switch 48, which is pivoted for rotation at point 55a. Switch 48 is of the mechanically locked type, and for this purpose its left-hand end is provided with a reentrant latch 56, which is adapted to be engaged by the pin or end 57 of a locking arm 58. The lower end of arm 58 is attached to a rocker shaft 58a. Also attached to shaft 58a is an arm 59, which is connected through a short heavy gauge coil spring 60 to another arm 61 carried by a rotatable clutch band 62 which is of the expansible type, and the ends of which are normally held apart and out of driving contact with drum 63 by an intervening spring 64. Drum 63 is driven by a gear 63a which carries a pin 63b adapted to engage a lug 63c connected to drum 63. The arm 59 in conjunction with the spring 60 acts in the nature of a snap-action switch or toggle as will be described, to control the mechanical locking and unlocking of the switch member 48 after the latter has been operated by winding 47. In Fig. 1, the parts are shown in their normal or at rest position. However, when switch 48 is operated as above described, it connects the field winding 35 in circuit between the battery terminal 46, contact 65 and grounded contact 66. This ground is also extended over conductor 67, contact 68, and armature 69, of a three-armature contact set controlled by arm 58, thence over conductor 70, through the armature 34, conductor 71, armature 72, contact 73, to battery 46. This causes the motor to drive gear 36 and the parts 32, 19 and 12, in a counter-clockwise or homing direction until the stop lug 32 engages the fixed stop 31. The motor continues rotating however, even though the shaft 12 is stopped because of the intervening slip-friction clutch 37. While the drum 19 is being thus returned to home, the pin 40 engages the ratchet 41 and rotates the drum 20 as well as the switch disc 42. During this rotation of disc 42, it may happen that the open section 43 will come into registry with the grounded #3 contact. However, while the previously described energizing circuit for winding 47 may be thus momentarily opened, nevertheless the motor will continue rotating because of the fact that the contacts 65 and 66 are mechanically held locked by reason of the engagement of arm 58 with latch 56. It becomes necessary however eventually to reverse the direction of the motor rotation, and for thus purpose the clutch which controls the arm 58 is adapted to be operated to reverse the motor control contacts, this reversal taking place at the limit of rotation. It will be noted that the clutch drum 63 is driven under control of the pin 63b and lug 63c, but during the previously described rotations, the clutch band 62 is effectively out of engagement with the drum 63. However, when the limit of rotation in the counter-clockwise direction is approached, the pin 63d carried by drum 63 engages the band lug 74 and causes the drum 63 to rotate the band 62, causing a compression of spring 60. The gearing ratio is such that the pin 63d does not engage the lug 74 until the switch disc 42 has found the previously marked contact. When this happens, the circuit for winding 47 is opened and a short interval thereafter the limit of rotation is reached and the spring 60 is compressed. Also the portion 57 of arm 58 is removed from the latch 56, thus permitting the switch 48 to open contact 65 and 66, whereupon the motor 33 immediately comes to rest. If the switch disc 42 is not accurately centered on the selected contact, this will be indicated by the fact that the contacts 45 and 49 are closed. As soon as centering takes place, the contacts 45 and 49 are opened thus preventing any further counter-clockwise rotation of the motor. At the same time, the previously compressed spring 60 causes the arm 58 to move to the right in the nature of a toggle action, thus causing the mechanically connected relay armatures 69, 72 and 75 to move to the right with a snap-action or toggle effect, and causing the motor 33 to begin rotating in a clockwise or final selecting movement. Because of the ratchet drive 40, 41, the previously set position of drum 20 and of the selected pawl, as well as the previously selected position of switch 42, are not disturbed. During this clockwise rotation, stop ring drum 19 likewise rotates clockwise until the appropriate stop lug 16, 17, 18, engages the previously selected pawl #3. Eventually the pin 63d again engages the lug 74 and causes the relay armatures 69, 72 and 75 to be restored to normal position, whereupon the motor circuit is finally open. This completes the selecting cycle and insures that the shaft 12 is accurately positioned to tune the member 11.

Figure 2:
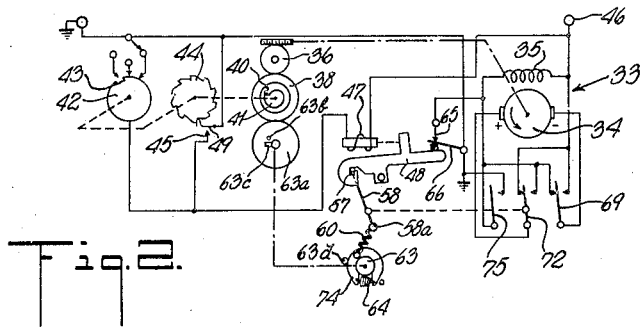
Figure 3:
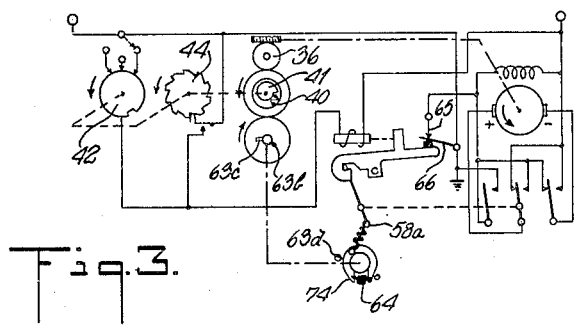
Figure 4:
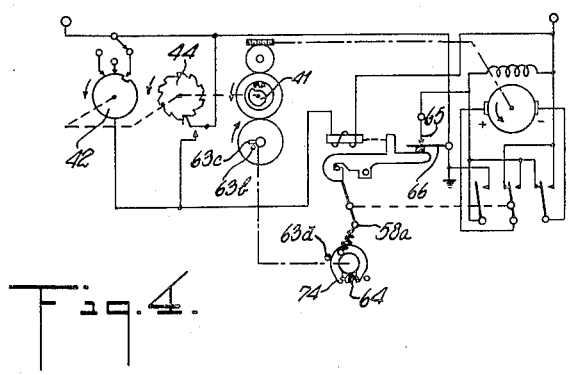
Figure 9:
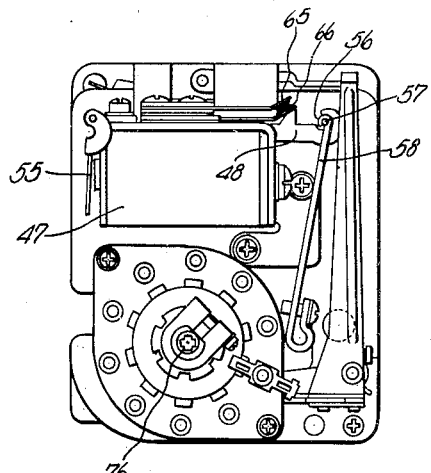
Fig. 9 is a front view of the timing and control device schematically illustrated in Fig. 1.

In order that the sequence of operations may be more clearly understood, reference may be had to the schematic diagrams of Figs. 2 to 8, wherein the parts corresponding to those of Fig. 1 bear the same designation numerals. In Fig. 2, the switch winding 47 has just been energised as a result of the grounding of a newly selected contact, for example contact #3 in switch 52. As a result, contacts 65 and 66 are closed to complete the operating circuit of motor 33. At the same time, member 57 has dropped into the locking position to mechanically lock switch 48 closed. In Fig. 3, the motor is still rotating counter-clockwise and the switch member 42 and the timing cam wheel 44 have rotated approximately one-half of a revolution in a counter-clockwise direction, switch 48 being still closed. In Fig. 4, the motor is still rotating in a counter-clockwise direction and the switch member 42 and the timing cam wheel 44 likewise continue to rotate counter-clockwise, the switch contact 65 and 66 being mechanically held closed even though the cutout 43 should pass the #3 grounded contact. In this Fig. 4, the pin 40 is about to approach the actuating lug 74 of the clutch. In Fig. 5, the motor is still rotating in a counter-clockwise direction as are the switch member 42 and the timing cam wheel 44. In the meanwhile, the clutch band 62 has compressed the spring 60 which operates the arm 58, which in turn controls the relay armatures 69, 72 and 75. At this time also the member 57 has moved out of locking engagement with the latch 56. In Fig. 6, the switch 42 and timing cam wheel 44 are shown as having reached their selected position, thus breaking the energizing circuit of winding 47. Switch 48 thereupon releases and causes the motor to cease counter-clockwise rotation. Thereupon the compressed spring 60 operates the relay armatures 69, 72 and 75, to reverse the direction of rotation of the motor. In Fig. 7, the motor is still operating in its clockwise or final selecting movement, relay armatures 69, 72 and 75 being still held in place by the arm 58 and the released spring 60. In Fig. 8, the pin 40 engages the clutch lug 74 and drives the arm 58 to a position to restore the relay armatures 69, 72 and 75 to their original position, and likewise allowing arm 58 to return to its original position. The motor is thus deenergized and has completed its clockwise rotation. The complete tuning cycle is ended and the system is ready for the subsequent selection of any new tuned position.

From the foregoing description, it will be seen that the motor power circuit, and therefore the selective stopping of the drum 20, is primarily controlled by the cutout segment 43 of the finder switch. If however, for any reason, the proper angular correlation is not obtained between the stopping of the finder switch and the stopping of the drum 20, it is possible by adjusting member 49b to change the timing relation between contacts 45, 49, and the wheel 44, thus providing an accurate control of the stopping of drum 20 since the motor circuit remains closed until the contacts 45, 49, are open.

Figure 10:
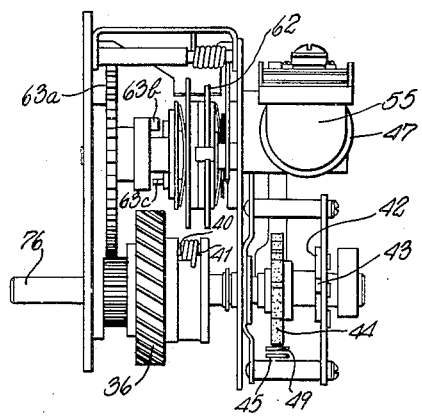
Fig. 10 is a left-hand end view of Fig. 9.
Figure 11:
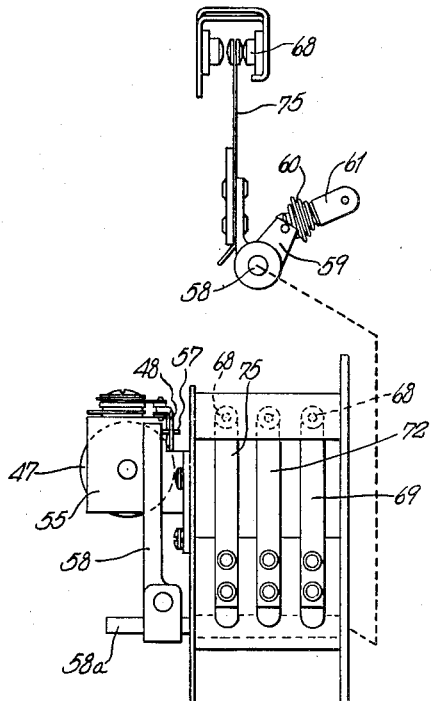
Fig. 11 is a detailed view of a portion of Figs. 9 and 10.
Figure 12:
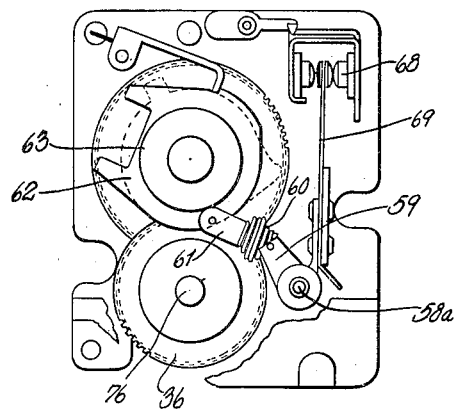
Fig. 12 is a view similar to Fig. 9, but with certain parts removed to show more clearly the action of the motor control switch operating mechanism.

Referring to Figs. 9-12, there is shown an actual finder switch and timing unit that can be incorporated in the system of Fig. 1. In Figs. 9-12, the parts which are functionally identical with those of Fig. 1, bear the same designation numerals, and it is believed that further detailed description thereof is not necessary at this point. Suffice it to say that shaft 76 which carries the finder switch disc 42 is adapted to be connected to the shaft of drum 29, and this shaft also drives the timing wheel 44 (Fig. 10). The magnet winding 47 when energized latches the arm 58 in the position shown in Fig. 2. The shaft 76 thereupon rotates and turns the switch disc 42 until the cutout sector 43 registers with the selected contact. After an interval the clutch band 62 is coupled to drum 63 to control the compression of spring 60 (Fig. 11) so that subsequently when the winding 47 is deenergized, spring 60 can shift the relay armatures 69, 72 and 75 to the motor reversing position (Fig. 7). Thereafter, the clutch band 62 is again coupled to drum 63 until the spring 60, by reason of the reversal of rotation of the drum 63, causes the contacts 69, 72 and 75 to be mechanically switched back to their normal position (Fig. 8), allowing the switch 48 to restore to its normal position.

While one particular embodiment has been disclosed, it will be understood that various changes and modifications may be made therein without departing from the spirit and scope of the invention.

What is claimed is:

1. In an automatic shaft positioning system of the type having a plurality of selectable stop members whose selection is controlled by a rotatable device and an associated automatic selector switch, said switch having a rotor and an associated set of stationary contacts each allotted to a particular selective position of said device, a common motor for driving said device and said switch, a motor control circuit, and means to maintain said circuit closed until said device reaches its desired setting, the last-mentioned means including a first set of contacts controlled by said automatic switch, and an alternative set of contacts controlled by another member which is rotatable continuously as a unit with said selector switch rotor during the rotor rotation, the said other member comprising a multi-toothed cam wheel having a series of teeth equal in number to said stationary contacts.

2. In an automatic shaft positioning system of the kind having a plurality of selectable stop members whose selection is controlled by a rotatable device and an associated automatic selector switch, said switch having a rotor and an associated set of stationary contacts each allotted to a particular selective position of said device, a common motor for driving said switch and said device, a first motor control circuit controlled by the automatic switch, and a second motor control circuit controlled by a timing member continuously rotatable as a unit with the rotor of said automatic switch during the rotor rotation, said timing member comprising a multi-toothed cam wheel having a series of teeth equal in number to said stationary contacts.

3. In an automatic shaft positioning system of the type having a rotatable selecting drum to be stopped in any one of a series of selective positions, an automatic selector switch having a series of stationary contacts each allotted to a particular selective stopping position for said shaft and a brush member rotatable to successive stationary contacts and having a portion adapted to register with said contacts for selectively stopping of the brush member, a motor for driving said drum and said brush member, a pair of timing contacts, a device rotatable with said switch brush member for operating said timing contacts in timed relation to the arrival of said drum at its successive selective positions, a first power control circuit for the motor and controlled by said brush member, and an alternative power control circuit for said motor and controlled by said timing contacts, said device comprising a multi-toothed cam wheel having a series of teeth equal in number to the number of said stationary contacts and rotatable continuously as a unit with said brush member.

4. In an automatic shaft positioning system of the type comprising a rotatable stop ring drum, a rotatable pawl selector drum, a plurality of pawls selectively settable under control of said pawl selector drum, an automatic selector switch for primarily controlling the selective stopping of said pawl selector drum, a motor for driving both said drums and said switch in a continuous rotary motion until selectively stopped, and a multi-toothed timing member also driven by said motor for insuring final accurate stopping of said drum independently of said selector switch, said timing member having a series of teeth equal in number to the number of selective stopping positions.

5. In an automatic shaft positioning system of the type comprising a rotatable stop ring drum arranged to be moved first to a homing position and then to a final selective stopping position for said shaft, a rotatable pawl selector durm, a plurality of pawls selectively settable under control of said pawl selector drum, an automatic selector switch for primarily determining the selective stopping of said pawl selector drum, a motor for driving said drums and said switch, an electromagnetic switch for completing the motor circuit, a first control circuit for said switch controlled by said automatic selector switch, a second control circuit for said electromagnetic switch, a timing wheel operating in unison with said switch for controlling said second control circuit, and means mechanically locking said electromagnetic switch independently of both said control circuits to insure that said stop ring drum is returned to home position independently of said selector switch.

6. In an automatic shaft positioning system of the type comprising a rotatable stop ring drum arranged to be moved first to homing position and then to a final selective position for stopping said shaft, a rotatable pawl selector drum, a plurality of pawls selectively settable under control of said pawl selector drum, an automatic selector switch for primarily determining the selective stopping of said pawl selector drum, a motor for driving said drums and said switch, motor control contacts, an electromagnet for operating said motor control contacts, a first circuit for energizing said electromagnet through said selector switch until said switch arrives at a contact which identifies the selected stopping position of said pawl selector drum, a second circuit for energizing said electromagnet, a multi-toothed timing wheel having a series of teeth equal in number to the selective positions of said automatic selector switch and the number of selective stopping positions for said shaft, said wheel being rotatable as a unit with said switch and arranged to break said second circuit only when said pawl selective drum is in its final selected stopping position.

7. An automatic shaft positioning system according to claim 6 in which said timing wheel has a toothed cam-like periphery, and a pair of contacts are arranged in said second circuit and cyclically opened and closed by said timing wheel as it rotates.

8. An automatic shaft positioning system according to claim 6 in which said timing wheel is driven by said motor continuously as a unit with said pawl selector drum, a pair of contacts are arranged in said second circuit to be cyclically opened and closed by said wheel as it rotates, and means to adjust said contacts with respect to said wheel to control the timing of their closure and opening with respect to the rotation of said wheel.

9. An automatic shaft positioning system according to claim 4 in which an electromagnetic motor switch is provided for controlling the power supply to said motor, a first circuit including said automatic selector switch for energizing said motor switch, a second circuit including a pair of contacts controlled by said timing wheel for energizing said motor switch, means mechanically locking said motor switch closed until said automatic selector switch reaches a selected position, said second circuit being maintained closed by said timing wheel until said pawl selector drum reaches its desired stopping position, a limit device responsive to a predetermined extent of rotation of the motor in one direction to mechanically unlock said motor switch and to close a reversing circuit for said motor, which reversing circuit is independent of said motor switch, and means effective upon a predetermined extent of motor rotation in said reversed direction to finally open the motor circuit.

10. An automatic shaft positioning system of the type having a stop ring drum which is rotatable in one direction to a homing position and in a reverse direction to a final selective stopping position, a cam drum which is rotatable in one direction only to a selective stopping position, an automatic selector switch for primarily determining the stopping of said cam drum, a reversible electric motor for driving said drums and said switch, a motor reversing switch, a motor starting switch, a first circuit for said motor starting switch which is controlled through said automatic selector switch, a timing wheel rotatable as a unit with said automatic selector switch, a second circuit for said motor stopping switch and including contacts controlled by said timing wheel, a mechanical interlock between said motor starting switch and said motor reversing switch, means including said interlock for mechanically locking the motor starting switch closed independently of said first and second circuits, and a limit control device which is responsive to a predetermined extent of motor rotation in one direction for mechanically releasing said interlock to release said motor starting switch and for operating said motor reverse switch to start reverse rotation of the motor for driving said stop ring drum to its final selective stopping position.

11. An automatic shaft positioning system according to claim 10 in which said limit control device includes a friction clutch having a member rotatable in fixed time relation with respect to said stop ring drum, and a clutch member which is connected to said interlock means, said clutch member being normally out of driven contact with the rotatable clutch member except at the limits of rotation of said motor.

12. A timing and selective stopping device for automatic control arrangements for radio sets and the like, comprising a main shaft which is arranged to be moved first in one direction to a home position and then in the opposite direction to any one of a series of selective stopping positions, an automatic selector switch of the line finder type for controlling the selective setting of said main shaft, a driving shaft for rotating the wiper of said switch, a timing wheel having a cam-like periphery also driven from said driving shaft, a motor start switch comprising an electromagnet with an armature and a pair of motor control contacts, a main operating circuit for said electromagnet controlled through the wiper and contacts of said switch, a clutch drum driven from said driving shaft, a clutch member cooperating with said clutch drum, a motor reversing contact assembly, and a shiftable member providing a mechanical interlock between the armature of said electromagnet and said clutch member for maintaining said motor control contacts closed after said electromagnet is deenergized upon said wiper arriving at a selected position to insure the movement of said main shaft to its home position.

13. A timing and selective stopping device according to claim 12 in which said driving shaft is coupled to said switch and to said timing wheel through a one-way drive member but is coupled to said clutch drum for reversible driving relation.

14. A timing and selective stopping device according to claim 12 in which a pair of motor-control contacts are mounted adjacent said timing wheel, and means are provided for adjusting the position of said pair of contacts with respect to said wheel for the purpose set forth.

15. In an automatic shaft positioning system, a stop control drum having a series of selective shaft stopping positions, another rotatable drum, a plurality of selectively shiftable stop members cooperating with both of said drums, an automatic selector switch having a rotor movable continuously as a unit with said other drum to determine the selective operation of one of said stop members, a motor for driving the stop control drum first in one direction to a homing position and then in a reverse direction to a selectively stopped position, said motor also driving the second-mentioned drum and said switch rotor, a pair of alternative circuits for controlling the supply of power to the motor, one of said circuits being completed through the rotor of said selector switch and being opened when said rotor arrives at a selected position, a multi-toothed cam wheel rotatable as a unit with said switch rotor to maintain the other motor circuit closed until said other drum reaches its proper setting, and interlock means for maintaining the motor circuit closed independently of said automatic selector switch and of said multi-tooth cam to insure that said stop control drum reaches its home position.

RICHARD W. MAY.

REFERENCES CITED

The following references are of record in the file of this patent:

UNITED STATES PATENTS

| Number | Name | Date |
| --- | --- | --- |
| Re. 22,574 | Collins | Dec. 5, 1944 |
| 2,409,895 | Phelps | Oct. 22, 1946 |